(12) United States Patent
Garrec et al.

(10) Patent No.: US 8,902,106 B2
(45) Date of Patent: Dec. 2, 2014

(54) SYSTEM FOR MEASURING THE RADIAL SPEED OF A MOVING BODY

(75) Inventors: Patrick Garrec, Merignac (FR); Pascal Cornic, Guilers (FR); Stéphane Kemkemian, Paris (FR)

(73) Assignee: Thales, Neuilly sur Seine (FR)

( * ) Notice: Subject to any disclaimer, the term of this patent is extended or adjusted under 35 U.S.C. 154(b) by 286 days.

(21) Appl. No.: 13/309,322

(22) Filed: Dec. 1, 2011

(65) Prior Publication Data

US 2012/0212373 A1    Aug. 23, 2012

(30) Foreign Application Priority Data

Dec. 3, 2010    (FR) ..................................... 10 04719

(51) Int. Cl.
| | | |
|---|---|---|
| *G01S 3/02* | (2006.01) | |
| *G01S 1/44* | (2006.01) | |
| *G01P 3/36* | (2006.01) | |
| *G01S 11/10* | (2006.01) | |

(52) U.S. Cl.
CPC .. *G01P 3/36* (2013.01); *G01S 11/10* (2013.01)
USPC ............................. 342/461; 342/398; 342/463

(58) Field of Classification Search
USPC ............ 342/104, 398, 418, 461, 463; 356/27, 356/28.5
See application file for complete search history.

(56) References Cited

U.S. PATENT DOCUMENTS

| | | |
|---|---|---|
| 3,409,369 A | 11/1968 | Bickel |
| 4,301,455 A | 11/1981 | Yetter |
| 4,442,432 A | 4/1984 | Quigley |

FOREIGN PATENT DOCUMENTS

DE    767 455 C    8/1958

OTHER PUBLICATIONS

Loic Morvan, et al, "High Resolution Range Measurement Using Lidar-Radar Concept", IEEE International Topical Meeting on Microwave Photonics, Oct. 4-6, 2004, pp. 131-133, IEEE, Piscataway, NJ, US XP010771540.

*Primary Examiner* — Dao Phan
(74) *Attorney, Agent, or Firm* — Baker & Hostetler LLP

(57) ABSTRACT

A system for measuring the radial speed of a moving body in a line of sight determined for a referential position is disclosed. The system includes an emitter assembly for emitting a signal and a referential receiver assembly dedicated to reception of the signal. The emitter assembly is disposed on a first of the elements of a group formed by the moving body and the referential position. The receiver assembly is disposed on a second of the elements of the group. The emitter assembly is able to emit a signal on at least two emission frequencies, where the emission frequencies are separated by a chosen emission frequency gap. The system also includes an analyzer configured to analyze the signal received by the receiver assembly, and to measure the reception frequency gap separating the signal reception frequencies to calculate the radial speed of the moving body according to a function of the reception frequency gap and emission frequency gap.

7 Claims, 3 Drawing Sheets

SYSTEM FOR MEASURING THE RADIAL SPEED OF A MOVING BODY

CROSS-REFERENCE TO RELATED APPLICATION

This application claims priority to foreign French patent application No. FR 1004719, filed on Dec. 3, 2010, the disclosure of which is incorporated by reference in its entirety.

FIELD OF THE INVENTION

The field of the invention relates to a system for measuring the radial speed of a moving body. The invention applies for example to a system for detecting motion of a moving body, to a guidance system for a moving body and a deck-landing or landing system for an aircraft and more generally for two moving bodies.

BACKGROUND

Customarily, moving body motion detection systems, notably for automobile or aerial radar systems, utilize the Doppler effect to determine the speed of displacement of a moving body. Radar systems comprise an emitter of a radiofrequency signal and a receiver of the radiofrequency signal. Once the signal has been emitted by the emitter towards the moving body in motion the latter is reflected and then sensed by the receiver. The determination of the speed of the moving body is based on the fact that the frequency of the sensed signal varies as a function of the radial speed with respect to the carrier. In a Galilean referential frame, the referential frame of the medium in which the wave propagates (for example the atmosphere for radars), if by convention the speeds are considered positive in the direction of propagation of the emitted signal, the frequency emitted by the emitter is denoted by $F_{emitter}$ and the frequency received by the receiver by $F_{receiver}$, we obtain:

$$F_{receiver} = (C - V_{receiver})/(C - V_{emitter}) * F_{emitter}$$

i.e. $F_{doppler} = (V_{receiver} - V_{emitter})/C * F_{emitter}$

With:

$$F_{doppler} = F_{emitter} - F_{receiver}$$

$V_{emitter}$, the radial speed of the emitter, $V_{receiver}$, the radial speed of the receiver, and C the speed of light.

When the emitter is situated on the moving body, direct measurement of the relative speed of a moving body on a single frequency is not possible since it requires two oscillators which are perfectly phase-coherent, one at the level of the emitter and the other at the level of the receiver. This measurement would also require a perfectly constant and known frequency gap between the oscillator of the emitter and the oscillator of the receiver.

The measurement of the speed of a moving body is a significant point in servocontrol. The mechanical stresses introduced by the vibrations and knocks of the moving bodies on the stability of the frequencies of the beacons with which they are equipped are significant, thus raising the cost of the onboard electronics or indeed prohibiting the employment of this solution on inexpensive applications. Thus, a problem with the prior art solutions resides in the difficulty of controlling the stability and purity of the wave emitted as a function of the environment (temperature, vibrations, power supply modulation etc.).

According to the prior art, there exist various ways of calculating the azimuthal and elevational angular positions. In the case of an aircraft comprising an optronics pod equipped with antennas, it is possible to ascertain these data on the basis of goniometric weighings and interferometers. Goniometric weighings lack precision and require precise calibrations, while interferometers are expensive and implement complicated electronics.

It is also possible to install a radar in proximity to the departure of the moving body so as to perform the measurements with the known problems of discretion and jamming, the radar being by necessity pointed towards the objective.

SUMMARY OF THE INVENTION

In one aspect, the invention improves the precision of measurement of speed and of positioning of a moving body.

In another aspect, the invention provides a low-cost solution for a system for measuring the radial speed of a moving body with respect to a referential point.

More precisely, the invention is a system for measuring the radial speed of a moving body in a line of sight determined with respect to a referential position comprising an emitter assembly for emitting a signal and a referential receiver assembly dedicated to the reception of the said signal.

Advantageously, the emitter assembly is able to emit a signal on at least two emission frequencies, the said emission frequencies being separated by a chosen emission frequency gap, and the measurement system furthermore comprises a means for analyzing the signal received by the receiver assembly, the said analyzing means being able to receive the dual-frequency signal reception frequencies, a reception frequency being the function of an emission frequency altered by the Doppler effect related to the displacement of the moving body, and to measure the reception frequency gap separating the said signal reception frequencies so as to calculate the radial speed of the moving body according to a function of the said reception frequency gap and of the emission frequency gap. According to the invention, the emitter assembly is disposed on a first of the elements of a group formed by the moving body (10) and the referential position (3). The receiver assembly (2) is disposed on a second of the elements of the group.

The invention exhibits another significant advantage with respect to the use of a radar used to measure the radial speed of a moving body. In a radar system the emitter assembly and the receiver assembly are both disposed at the referential position or in immediate proximity to the latter. The radar requires an outbound and return journey of the electromagnetic wave with reflection on the moving body. On the contrary, separating the receiver assembly and the emitter assembly, one disposed at the referential position and the other disposed on the moving body, makes it possible to implement just a single journey instead of two in the case of the radar.

Moreover, the implementation of a dual-frequency measurement makes it possible to dispense with a common time base shared by the emitter assembly and by the receiver assembly. Indeed, even in the case of disturbance undergone by the emitter assembly, the two emitted frequencies are disturbed in the same manner, this not affecting the frequency gap used for the radial speed measurement. Among disturbances may for example be cited those due to significant mechanical stresses due to a high-speed launch of the moving body. This type of stress generating strong accelerations can disturb an oscillator used to generate the emission frequencies. Advantageously, the system comprises just a single oscillator to generate the two emission frequencies. One of the frequencies can arise directly from the oscillator and the other frequency can arise from division of the frequency of the oscillator.

According to one embodiment, the emitter assembly is able to emit at least two signals simultaneously, a first signal being emitted on a first emission frequency and the second signal being emitted on a second emission frequency.

According to a second embodiment, the emitter assembly is able to emit a location signal on two alternately emitted frequencies.

The invention applies for example to a guidance system for a moving body comprising a system for measuring the radial speed of the moving body according to the invention. Advantageously, the receiver assembly comprises at least two radiofrequency sensors, and it furthermore comprises an optronics pod situated between the said sensors so as to servocontrol the position of the moving body by comparing the measurement of the radial speeds on the said sensors.

The invention can also be applied to a system for aiding deck-landing or landing for an aircraft comprising at least one system for measuring the radial speed of the moving body.

The invention also applies to a system for detecting low speed in ground clutter.

Preferably, for a deck-landing or landing system for an aircraft the receiver assembly comprises two radiofrequency sensors separated by a chosen distance, and more generally for any trajectography monitoring system.

The invention exhibits the advantage of being inexpensive with regard to the solutions of the prior art since the simplicity of the functions carried out by the receiver, the emitter and the calculation means makes it possible to utilize low-cost technical means.

Furthermore, the use of a passive solution for receiving information, contrary to a radar solution according to the prior art, to measure the Doppler speed, makes it possible to implement the system on discreet carriers without appreciable impairment of discretion.

Moreover, the invention is insensitive to the thermal fluctuations of the carrier.

Moreover, low signal powers are sufficient to carry out the measurements upon reception.

BRIEF DESCRIPTION OF THE DRAWINGS

The invention will be better understood and other advantages will become apparent on reading the description which follows given without implied limitation and by virtue of the appended figures among which.

DETAILED DESCRIPTION

The invention is a system for measuring the radial speed of a moving body on the basis of Doppler frequency. It also makes it possible to measure the position of the moving body on the basis of the initial position information. To obtain the radial speed parameter, the invention utilizes the Doppler measurement of a frequency gap for a signal emitted from the moving body. The measurement of the frequency gap offers the advantage of circumventing errors of generation of variation of the frequency of the emitter. Through the Doppler-dressed frequency gap, it is possible to calculate the relative speed of a moving body with respect to a referential position, stationary or moving, without the calculation being dependent on drifts of thermal origin or of any other origin. Indeed, the calculation of the radial speed of the moving body is executed on the basis of the data of the frequency difference and not of the absolute frequency.

Figure 1:
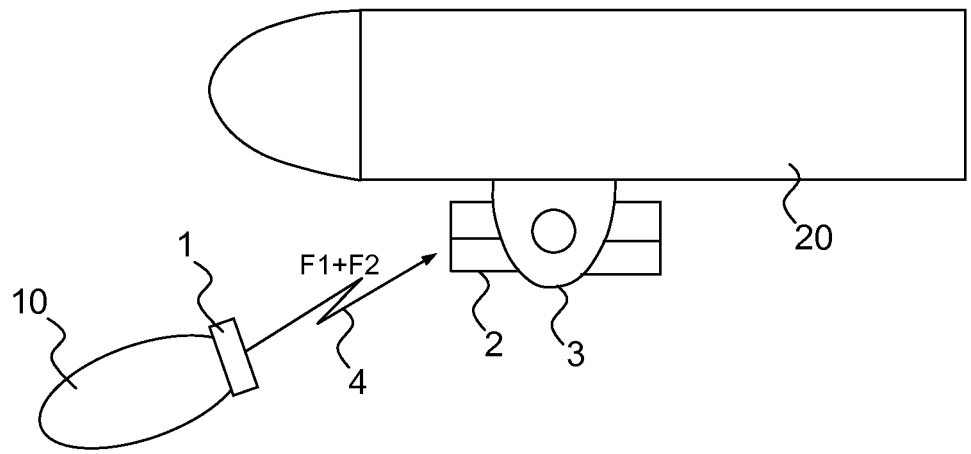
FIG. 1 represents a functional diagram of a system composed of two moving bodies according to a first embodiment.
Figure 2:
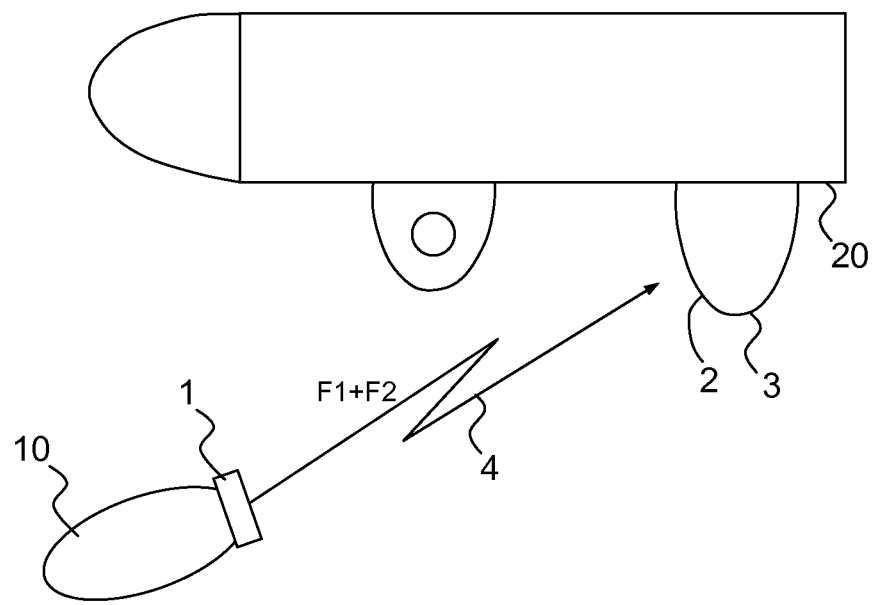
FIG. 2 represents a functional diagram of a system composed of two moving bodies according to a second embodiment.

As represented in FIGS. 1 to 2, the system for measuring the radial speed of a moving body according to the invention comprises an emitter assembly 1, a referential receiver assembly 2 and a means for analyzing a signal not represented.

According to an essential characteristic of the invention, the emitter assembly is able to emit a signal 4 on at least two emission frequencies $F1_{emission}$ and $F2_{emission}$, the said emission frequencies being separated by a chosen emission frequency gap. The emitter assembly comprises radiating elements suitable for transmitting a signal on one or more frequencies emitted successively on the same signal, or several signals on one or more frequencies also. The frequency of the signal emitted by the emitter assembly is called the emission frequency or $F_{emission}$. The emitter assembly 1 also comprises electronic means for generating a signal. Examples of electronic means for generating a signal that are suitable for the invention are described more precisely in the subsequent description by means of FIGS. 3 and 4. For example, an embodiment for the generation of two frequencies spaced a known value apart may be a direct digital synthesis (DDS) frequency generator.

According to a characteristic of the invention, the referential receiver assembly 2 is dedicated to the reception of the said signal 4. The receiver assembly comprises radiating elements suitable for sensing a signal on one or more successive frequencies on the same signal, or several signals on one or more frequencies also. The frequency of the sensed signal is called the reception frequency or $F_{reception}$, or for two frequencies $F1_{reception}$ and $F2_{reception}$. Moreover, a reception frequency is the function of an emission frequency altered by the Doppler effect related to the displacement of the moving body.

Furthermore, the receiver assembly comprises electronic and radiofrequency means for extracting from the sensed signal information data relating to the displacement of the moving body, notably the gap between the signal reception frequencies making it possible to deduce the radial speed of the moving body in the referential frame. Examples of electronic means for extracting signal information that are suitable for the invention are more precisely described in the subsequent description by means of FIGS. 5, 6 and 7. For example, a frequency gap may be measured on the basis of a low-frequency oscillator, for example of quartz type, which supplies a mixer with a carrier.

According to the invention, the signal analysis means comprises the electronic calculation means making it possible to calculate the frequency gap between two or more reception frequencies sensed by the receiver assembly 2. The difference between two reception frequencies $F1_{reception}$ and $F2_{reception}$ is equal to:

$$\text{Delta } F_{reception} = (C-V_{receiver})/(C-V_{emitter}) * \\ ((F2_{emission}+\text{Drift})-(F1_{emission}+\text{Drift})) = (C-V_{receiver})/(C-V_{emitter})*(F2_{emission}-F1_{emission})$$

with $V_{receiver}$ for the speed of the receiver, i.e. the speed of the referential position, and $V_{emitter}$ for the speed of the emitter i.e. of the moving body.

The Drift is the bias introduced by the thermal and pressure changes of the environment and the vibrations on the electronics.

The speed of the receiver and the difference between the two emission frequencies being known, the analysis means calculates the speed of the emitter without the impact of the exterior disturbances. Moreover, this calculation circumvents errors of generation and of variation of the frequency of the emitter. Preferably, a large gap between the frequencies $F2_{emission}$ and $F1_{emission}$ is chosen upon emission so that the value to be measured is more easily detectable because the frequency gap upon reception between $F2_{reception}$ and $F1_{reception}$ will also be large.

FIG. 1 represents a first mode of application of the invention relating to a system for tracking or detecting displacement of a moving body 10. The moving body 10 comprises a dual-frequency beacon 1 on board at the rear of the moving body 10. Thus the discretion and the difficulty of jamming are more significant, despite the tiny powers involved (of the order of a few milliwatts). It is possible to equip projected or jettisoned mobile elements with this simplified emission system.

The aircraft 20 or an item of equipment 3 secured to the aircraft is equipped with a receiver assembly 2 suitable for sensing the dual-frequency signal 4 emitted by the beacon 1. Likewise, the receiver consists of simple electronics. By virtue of this simplified and low-cost measurement system, the measurement of the speed of a projected or jettisoned moving body can easily be made accessible.

For a guidance system application for a moving body 10, it is possible to measure the rotation speed of the moving body on the basis of the measurement of the polarization of the signal for example by amplitude modulation. The rotation speed is obtained by measuring the mismatch effect related to the change of polarization when the moving body is in rotation.

Other modes of application are possible. For example, as illustrated by FIG. 1, the measurement system can be extended to the case of an aircraft or of a launcher on the ground. It is possible to install sensors on either side of an optronics pod 3 and to use the beacon 1 which is installed at the rear of the moving body 10 to ascertain the position and the relative speed of the moving body during their trajectory. The radial distance is known through temporal integration of the speed, the position at the origin being known. The azimuthal and elevational angular positions with respect to the optronics pod 3 (or referential position), situated at the centre of the antennas, may be known. By measuring the gap between two frequencies, and consequently the Doppler speed, it is possible to servocontrol the position of the moving body in such a way that the measurements are identical on the various antennas. This is explained by the fact that it involves the Doppler speed on the sight axis (or radial axis) at the antenna which is measured.

FIG. 2 represents a second embodiment. The aircraft or the launcher 20 is equipped with a radar. Thus it is possible to servocontrol the position of the radar pod to the optronics pod and to set up an autonomous guidance system for the moving body 10.

Figure 3:
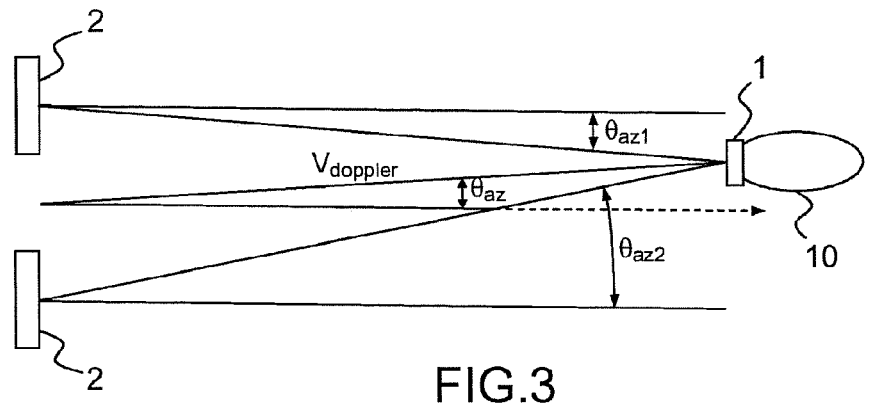
FIG. 3 represents a functional diagram of a system composed of two moving bodies according to a third embodiment.

FIG. 3 represents a third embodiment of the invention for an aircraft deck-landing or landing system. The use of the difference in the Doppler measurement for deck-landing sensors by measurement of at least two ground sensors allows measurement of angular gap and therefore guidance, in particular azimuthal, by comparing the doppler received on each of the sensors, without resorting to a technique of sophisticated receivers and antennas. The projection of the Doppler speed on each of the reception pathways 2 is measured.

According to this application, the receiver assembly comprises two sensors 2 and the moving body has an emitter assembly 1 on board. The principle consists in measuring an angular error $\theta_{az}$ equivalent to $(\theta_{az2}-\theta_{az1})/2$. The first sensor measures $\cos(\theta_{az1})*V_{Doppler}$ and the second sensor measures $\cos(\theta_{az2})*V_{Doppler}$. This operation may be carried out on the azimuthal and elevational axis.

In FIGS. 1 and 2, the emitter assembly 1 is disposed on the moving body 10 and the receiver assembly 2 on an aircraft 20 forming the referential position. It is of course possible to interchange the emitter assembly 1 and the receiver assembly 2, as for example in the case where the system is implemented for the deck-landing or the landing of the aircraft 20. In this case, an emitter assembly 1 is disposed on the landing runway or in proximity to the latter. More generally, the notion of speed is relative between two elements, one arbitrarily called the moving body and the other the referential position. These two names may be interchanged without however departing from the scope of the invention.

According to another application of the invention, the system makes it possible to measure the speed of barely moving targets, particularly when the surrounding clutter has near enough the same speed as the target. The use of a dual-frequency beacon makes it possible to detect the speeds of slowly moving objects without being penalized by the false alarm related to the surrounding clutter. A use in drones or in any moving platform, notably during the so-called rolling phases makes it possible to improve their tracking under particularly difficult conditions of measurement at grazing angle.

Figure 4:
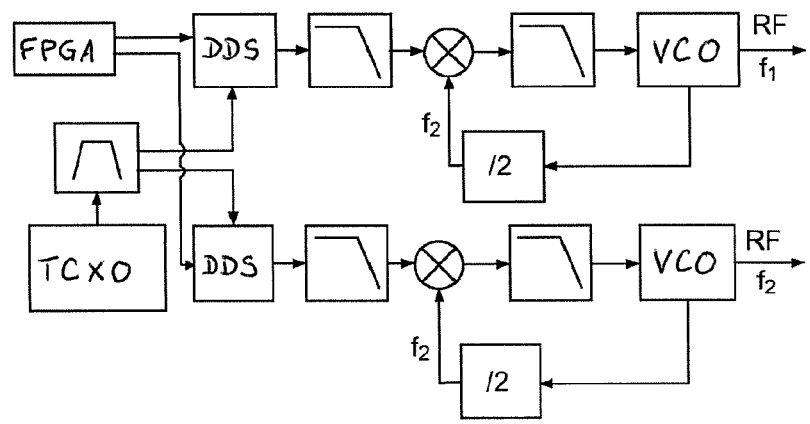
FIG. 4 represents a diagram of a first embodiment of a functional architecture of an emitter according to the invention.

FIG. 4 represents a first emitter embodiment for the system according to the invention. The generation of the two frequencies of the emitter assembly is carried out on the basis of two DDS generators supplied by one and the same FPGA ("Field Programmable Gate Array") circuit. An oscillator TCXO provides a filtered signal as input to each DDS generator. At the output of each DDS generator is present a frequency filter and a servocontrol loop clamped to a frequency f1 and f2 comprising a mixer, a frequency filter and an oscillator VCO. Thus, two RF signals having a frequency f1 for a first signal and a frequency f2 for a second signal are generated.

Figure 5:
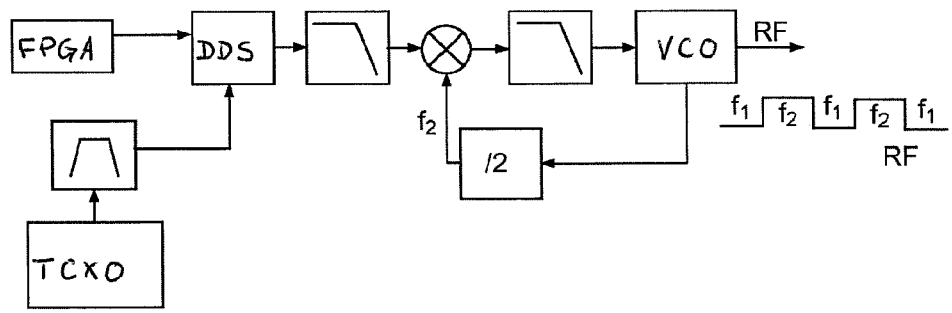
FIG. 5 represents a diagram of a second embodiment of a functional architecture of an emitter according to the invention.

FIG. 5 represents a second emitter embodiment for the system according to the invention. This alternative solution consists in emitting on one and the same signal sequentially two frequencies $F1_{emission}$ and $F2_{emission}$ with the same generator.

Other alternative solutions of emitters are possible. A microwave signal generator designed on the basis of gun diodes may be implemented. Such a solution exhibits a low production cost. Despite the low frequency-stability of such a signal-generating solution, the performance of the system is not impacted since the invention is based on analyzing the frequency gaps and not the absolute frequency.

Figure 6:
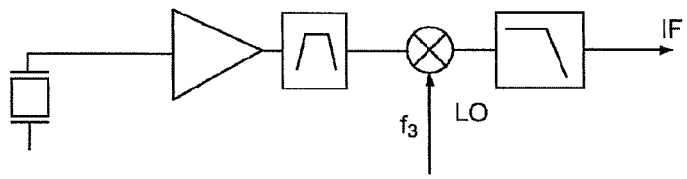
FIG. 6 represents a diagram of a third embodiment of a functional architecture of an emitter according to the invention.
Figure 7:
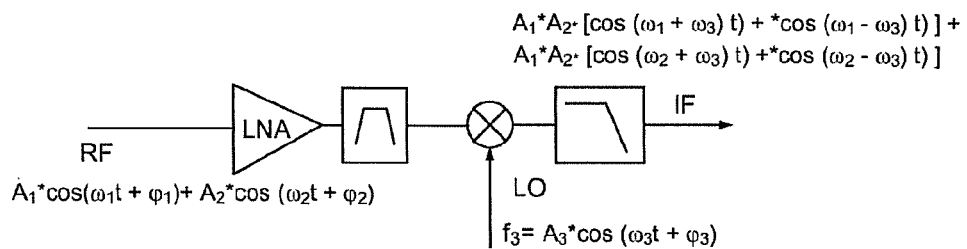
FIG. 7 represents a diagram of a first embodiment of a functional architecture of a receiver according to the invention.
Figure 8:
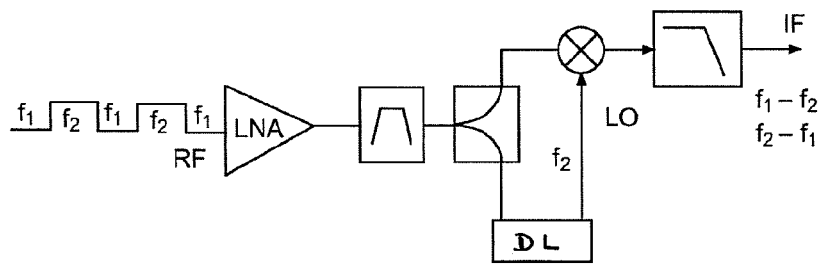
FIG. 8 represents a diagram of a second embodiment of a functional architecture of a receiver according to the invention.

FIGS. 6 to 8 illustrate the technical solutions of receivers that may be implemented within the scope of the invention. These figures show diagrammatically various solutions known from the prior art for obtaining the information regarding the Doppler frequency gap on the basis of one or more sensed signals. FIG. 6 represents an analogue architecture comprising a mixer. FIG. 7 represents a digital architecture comprising notably an analogue-digital converter LNA and a mixer. Other frequency measurement solutions are possible and the following may be cited by way of example: detection of zero-crossing after peak-limiting and saturation, fast coding on 1 bit and comparison with respect to a counter.

In the case of an emitter assembly transmitting an alterna of frequency on one and the same signal, with a rate of 50% for example, FIG. 8 represents a suitable receiver. According to this solution, the receiver comprises a delay line DL in the mixer chain. If the signal received is injected onto the two pathways of the mixer, the frequency gap is obtained by filtering the harmonics by means of a low-pass filter. This solution is very inexpensive and does not implement an oscillator in reception.

The invention claimed is:

1. A system for measuring a radial speed of a moving body in a line of sight determined with respect to a referential position, the system comprising:

an emitter assembly configured to emit a signal and a referential receiver assembly configured to receive said signal, the emitter assembly being disposed on first elements of a group formed by the moving body and the referential position, the receiver assembly being disposed on second elements of the group, the emitter assembly configured to emit the signal on at least two emission frequencies, said emission frequencies being separated by a chosen emission frequency gap, and an analyzer configured to analyze the signal received by the receiver assembly, said analyzer configured to receive signal reception frequencies, a reception frequency being a function of an emission frequency altered by the Doppler effect related to displacement of the moving body, and to measure a reception frequency gap separating said signal reception frequencies to calculate the radial speed of the moving body according to a function of said reception frequency gap and of the emission frequency gap.

2. The system according to claim 1, wherein the emitter assembly is configured to emit at least two signals simultaneously, a first signal being emitted on a first emission frequency and a second signal being emitted on a second emission frequency.

3. The system according to claim 1, wherein the emitter assembly is configured to emit the signal on at least two alternately emitted frequencies.

4. The system according to claim 1, wherein the emitter assembly is on board the moving body and the receiver assembly is positioned at the referential position.

5. A guidance system for a moving body, comprising:

a system for measuring the radial speed of the moving body according to claim 1, further comprising at least two radiofrequency sensors, and an optronics pod situated between said at least two radiofrequency sensors to servocontrol the position of the moving body by comparing the measurement of the radial speeds on said sensors.

6. The guidance system for the moving body according to claim 5, further comprising electronic means for measuring a rotation speed of the moving body by measuring polarization of the signal received.

7. A system for aiding deck-landing or landing for an aircraft according to claim 1, wherein the receiver assembly comprises two radiofrequency sensors separated by a chosen distance.

* * * * *